Nov. 1, 1927. 1,647,132
J. A. V. M. HILLEN
MACHINE FOR THE TREATMENT OF COCOA MASS AND THE LIKE
Filed Dec. 27, 1922  2 Sheets-Sheet 2
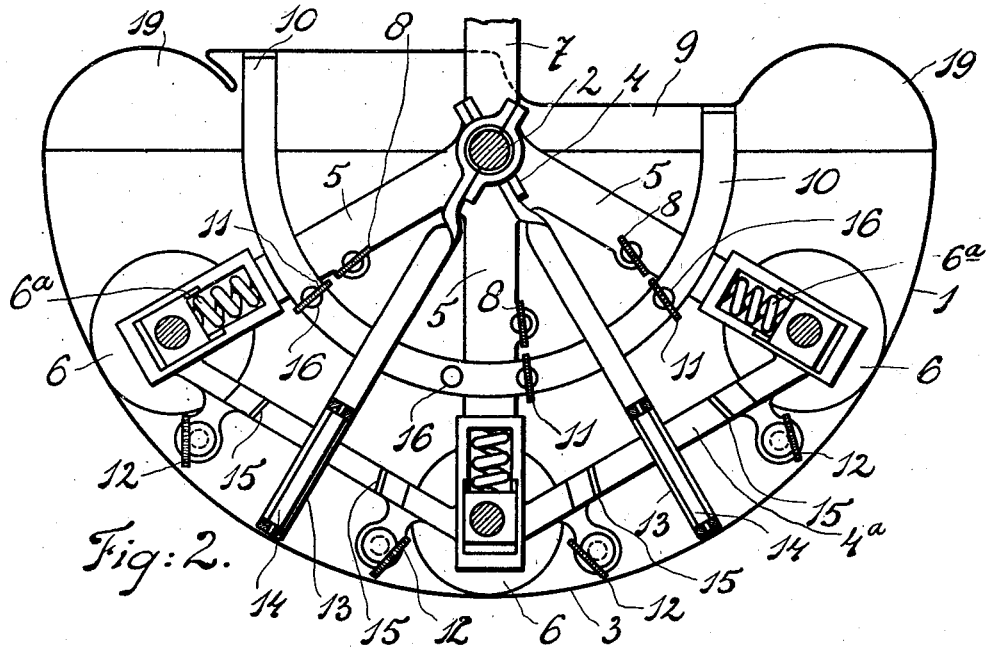
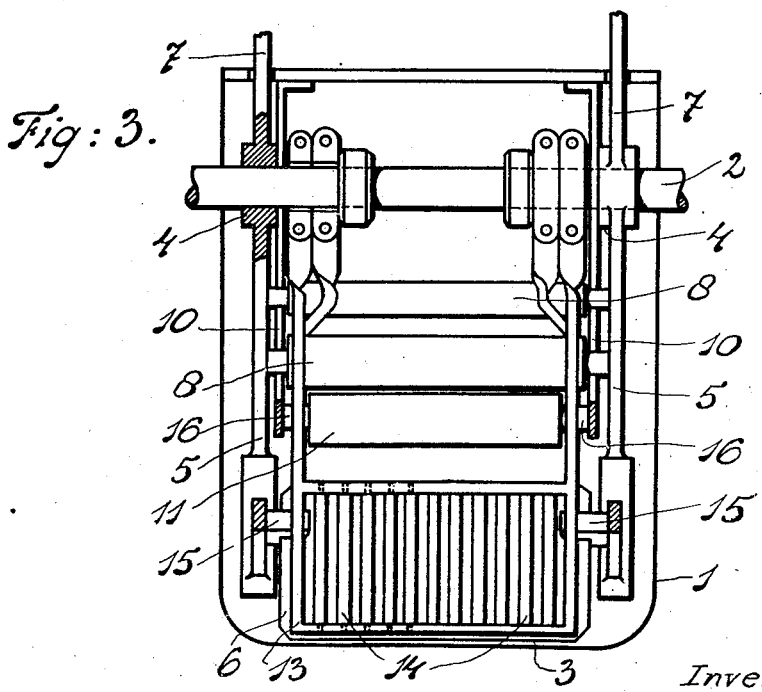
Inventor-
Johannes A.V.M. Hillen
By Kent W. Wonnell
Atty- Patented Nov. 1, 1927.

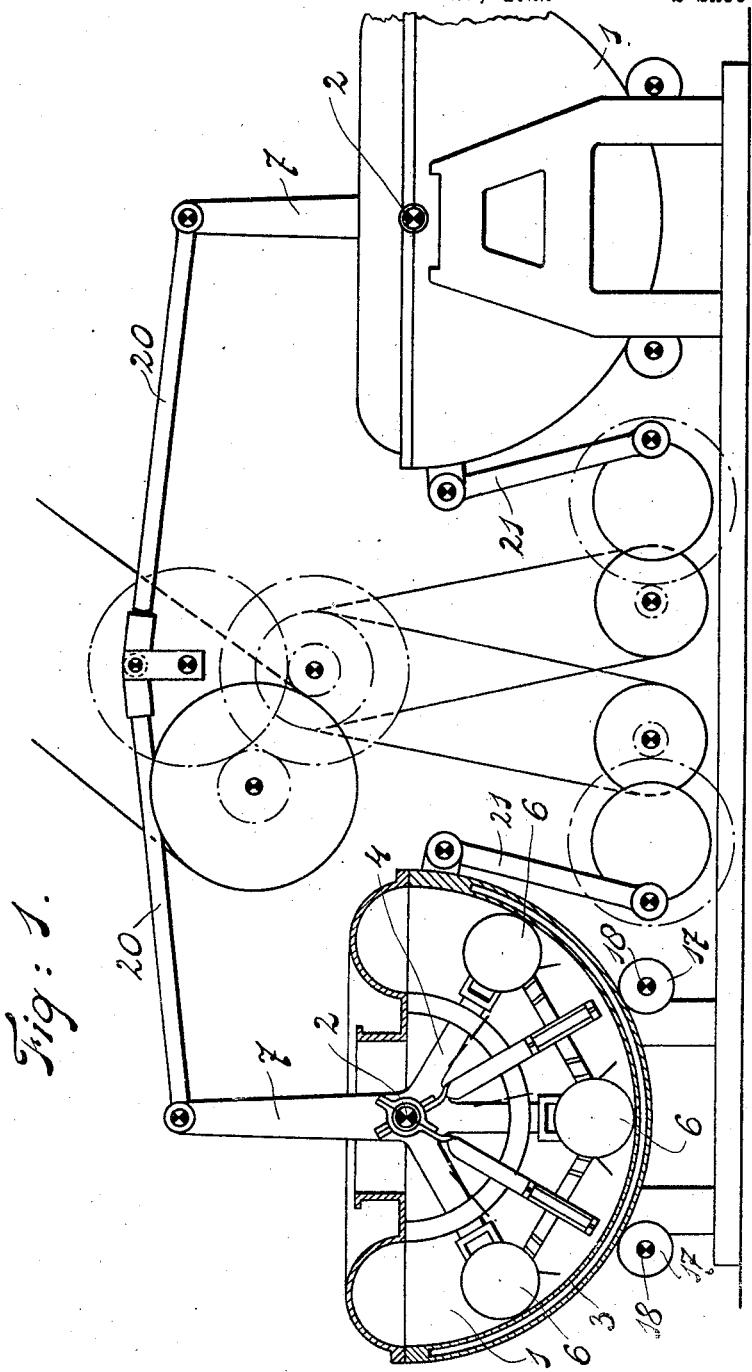

1,647,132

UNITED STATES PATENT OFFICE.

JOHANNES ALBERTUS VINCENTIUS MARIA HILLEN, OF AMSTERDAM, NETHERLANDS.

MACHINE FOR THE TREATMENT OF COCOA MASS AND THE LIKE.

Application filed December 27, 1922. Serial No. 609,238.

My invention relates to machines for the pulverizing and kneading of semi-fluid substances, especially cocoa mass. In the apparatus called "conche", which heretofore has been used extensively for the treatment of cocoa mass, this mass is pulverized by means of a roller, which is reciprocated over the heated bottom of a trough. This operation requires a great deal of time, as it is effected by means of one roller only, which operates only over a part of the bottom of the trough. The mass of cocoa at the ends of the trough, which is not a thin fluid, but has a very sluggish flow, returns only slowly to the middle of the trough, so that a comparatively small part of the total contents of the trough is at any time undergoing the required treatment.

The object of my invention now is to provide a machine which will overcome these objectionable features, in which machine the cocoa mass is subjected to a more intensive treatment in a much shorter time. This machine is principally characterized by having a frame which may be swung to and fro, and which is provided with a number of spring-pressed rollers, which rollers during the swinging movement of the frame will roll over the cylindrical bottom of the trough, adapted to be heated, said trough being likewise adapted to swing, but independently of the frame.

The invention possesses further a number of novel features, which will be described hereinafter, with reference to the annexed drawings, which show a preferred form of the machine in accordance with the invention, and in which drawings:

Figure 1 is a side view of the invention, partly in outline and partly in section;

Fig. 2 shows a vertical section through a trough, across the shaft around which both the frame and the trough are swinging; and—

Fig. 3 is a vertical section, parallel with said shaft.

The machine comprises one or more semi-cylindrical troughs 1, each of which is adapted to execute a swinging movement around a shaft 2, arranged in its centre. The bottom 3 of each trough is so disposed that it may be heated, for instance by means of a warm water or steam jacket.

In the trough 1 is arranged a frame-work 4, which is likewise able to swing around the shaft 2. In the form of the machine here shown this frame consists of three pairs of arms 5, each pair of arms carrying a roller 6, which rollers are adapted to roll over the bottom of the trough during the swinging movement of the frame. The rollers 6 are connected to the arms 5 by means of a spring $6^a$, so that they will be pressed against the bottom of the trough with a certain pressure. In addition to the arms 5 the frame is provided with an arm 7, which extends upwardly outside of the trough, and a reciprocating movement may be imparted to this arm 7 by means of a rod 20, in consequence of which the rollers 6 will move simultaneously over the bottom 3 of the trough.

To each pair of arms 5 is attached a knife 8. To each side of the cover 9 of the trough is attached a collar or hoop 10, and between said collars are also provided knives 11. In the position of rest of the trough and the frame, the knives 11 will be opposite the knives 8, while during the reciprocating movement of the trough by means of a rod 21, and the movement of the frame in the other direction, these knives will be moved along the knives 8. The knives 8 and 11 extend from one side of the trough to the other. The frame is further provided with knives 12, at a little distance from the rollers 6.

Between each pair of rollers is further provided a grate 13, which is freely suspended from the shaft 2. These grates, in the described form of the machine, are each composed of a number of parallel rods 14, and are limited in their reciprocating swinging movement by shoulders 15 on a part $4^a$ of the frame 4, so that they cannot fall against the rollers 6.

The collars 10 are provided with bosses or stops 16, which during the swinging movement of the trough will come in contact with the grates 13 and consequently will take along said grates and force them towards the rollers 6.

In order to facilitate the swinging movement of the trough, to prevent the wearing out of the shaft 2, and to enable a proper installation of the trough, the latter is supported at its under side by wheels or rollers 17 with ball bearings 18.

Lastly, the cover of the trough, at the end of the path of movement of the rollers 6, is shaped semi-cylindrically, as at 19, to conform to the configuration of the rollers, so that the mass of cocoa, worked upwardly by these rollers, may be pulverized and kneaded against said cylindrical cover and may be forced over said rollers towards the middle of the trough.

The machine operates as follows:

When the trough has been filled to the desired level with the mass of cocoa, the driving mechanism is set in motion and a swinging movement is imparted to the trough 1 by means of the crank-arm 21.

At the same time the arm 7 corresponding to each trough is reciprocated from the driving mechanism by the arm 20, so that the frame 4 will also reciprocate to and fro, but in reverse direction to that of the trough, moving to the right when the trough moves to the left, and vice-versa. The mass of cocoa on the heated bottom of the trough will thereby receive the desired treatment, the rollers 6 moving to and fro over the same. The knives 12 will prevent the mass from accumulating between the rollers 6 to a larger extent than is desirable for a proper treatment.

The mass, which is forced and pressed upwards in the trough by the rollers 6 is pulverized and kneaded fine by the two outer ones of these rollers in the semi-cylindrical ends 19 of the cover 9, thus preventing the formation of large lumps. The mass which falls over the rollers into the middle of the trough, is there cut into small pieces by the knives 8 and 11 and dropped between the rollers 6. Here it will find itself between one of the rollers 6 and one of the grates 13. When the trough moves to one side, one of the stops 16 will come in contact with the grate 13 and take the same along, moving it towards the roller 6. The mass which has dropped between the roller 6 and the grate 13 is thus kneaded fine and pressed through the rods 14. If the trough and the frame are moving in the opposite direction, then the same operation will take place on the other side of the roller and the grate.

With the aid of the above described machine, a large quantity of cocoa-mass may be subjected to the desired treatment within a short time.

I claim:—

1. In a machine of the class described, a cylindrical trough bottom, a frame mounted for swinging movement therein, rollers carried by the frame, and knives, one fixed with respect to the trough and the other carried by the frame movable past each other during the swinging movement of the frame.

2. In a machine of the class described, a cylindrical trough bottom, a frame with rollers carried thereby for movement in the trough bottom, the trough bottom and frame being mounted for relative and independent swinging movement, and knives arranged in sets, one set carried with the trough bottom and the other carried by the frame arranged for movement adjacent and past each other during the relative movement of the frame and trough.

3. In a machine of the class described, a trough bottom, a frame mounted for swinging movement therein, spaced rollers carried by the frame and movable in the trough bottom, a grate freely suspended between each pair of rollers, and means on the frame for limiting the swinging movement of the grates in each direction of movement of the frame.

4. In a machine of the class described, a trough bottom mounted for swinging movement, a frame in the trough bottom mounted to swing upon the same axis, rollers carried by the frame and yieldingly engaging the trough bottom, a grate swinging freely about the axis of the frame between each pair of rollers, stops on the frame to limit the movement of the grates in both directions, the grates serving as a wall against and through which the mass of material operated upon by the rollers is pressed thereby.

5. In a machine of the class described, a semi-cylindrical trough bottom, a frame mounted to swing about the upper edge thereof, rollers carried by the frame for engaging in the trough bottom, means for relatively moving the trough bottom and the frame, and a cover for the trough having a portion at each end of the path of rollers semi-cylindrical in shape conforming to the configuration of the rollers for obtaining a more intensive treatment of the material operated upon by the rollers against this portion of the cover.

6. In a machine of the class described, a cylindrical trough bar, a swinging roller carrying frame mounted therein, rollers for mounting the trough for swinging movement, means for independently swinging the trough and frame, and a cover for the trough having semi-cylindrical portions at the limits of the path of the rollers for obtaining an intensive treatment of the material against these portions of the cover.

In testimony whereof I have affixed my signature.

JOHANNES ALBERTUS VINCENTIUS MARIA HILLEN.